(12) United States Patent
Seyot et al.

(10) Patent No.: US 11,514,336 B2
(45) Date of Patent: Nov. 29, 2022

(54) AUTOMATED KNOWLEDGE BASE

(71) Applicant: MORGAN STANLEY SERVICES GROUP INC., New York, NY (US)

(72) Inventors: Nicolas Seyot, Stamford, CT (US); Richard J. Heise, Carmel, NY (US); Ziad Gemayel, Tarrytown, NY (US); Mohamed Mouine, Montreal (CA)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 17/440,472

(22) PCT Filed: May 5, 2021

(86) PCT No.: PCT/US2021/030801
§ 371 (c)(1),
(2) Date: Sep. 17, 2021

(87) PCT Pub. No.: WO2021/226184
PCT Pub. Date: Nov. 11, 2021

(65) Prior Publication Data
US 2022/0092443 A1 Mar. 24, 2022

Related U.S. Application Data

(60) Provisional application No. 63/020,878, filed on May 6, 2020.

(51) Int. Cl.
*G06N 5/02* (2006.01)
*G06F 40/40* (2020.01)
(Continued)

(52) U.S. Cl.
CPC ........... *G06N 5/022* (2013.01); *G06F 40/205* (2020.01); *G06F 40/295* (2020.01); *G06F 40/30* (2020.01); *G06F 40/40* (2020.01)

(58) Field of Classification Search
CPC ....... G06N 5/022; G06F 40/40; G06F 40/205; G06F 40/295; G06F 40/30
See application file for complete search history.

(56) References Cited

U.S. PATENT DOCUMENTS 7,386,845 B1    6/2008   Fox et al.
9,787,705 B1*   10/2017   Love .................... G06F 16/9024
(Continued)

OTHER PUBLICATIONS

Callahan, Tiffany J., Harrison Pielke-Lombardo, Ignacio J. Tripodi, and Lawrence E. Hunter. "Knowledge-based Biomedical Data Science 2019." arXiv preprint arXiv:1910.06710 (2019). (Year: 2019).*
(Continued)

*Primary Examiner* — Casey R. Garner
(74) *Attorney, Agent, or Firm* — K&L Gates LLP

(57) ABSTRACT

Domain specific knowledge base (KB) contains all concepts from domain and the semantic relations between concepts. The concepts and the semantic relations are extracted from an existing corpus of content for the domain. The World Wide Web Consortium (W3C) standard SKOS (Simple Knowledge Organization System) can be used and two types of semantic relations can be captured: hierarchal and associative. A Natural Language Processing (NLP) software engine can parse the input text to create a semantic knowledge graph, which is then mapped to a SKOS knowledge model. During the linguistic understanding of the text, relevant domain concepts are identified and connected by semantic links. Concepts automatically identified as most important in this domain can be promoted to another layer, referred to as "Topics."

10 Claims, 10 Drawing Sheets

(51) Int. Cl.
    *G06F 40/205*     (2020.01)
    *G06F 40/295*     (2020.01)
    *G06F 40/30*     (2020.01)

(56) References Cited

U.S. PATENT DOCUMENTS

| | | |
|---|---|---|
| 2009/0012842 A1 | 1/2009 | Srinivasan et al. |
| 2013/0096947 A1 | 4/2013 | Shah et al. |
| 2013/0260358 A1 | 10/2013 | Lorge et al. |
| 2015/0169758 A1 | 6/2015 | Assom et al. |
| 2015/0248478 A1 | 9/2015 | Skupin et al. |
| 2016/0012336 A1* | 1/2016 | Franceschini ....... G06F 16/3334 706/55 |
| 2016/0224893 A1 | 8/2016 | Parker, Jr. et al. |
| 2016/0335544 A1 | 11/2016 | Bretschneider et al. |
| 2017/0017635 A1 | 1/2017 | Leliwa et al. |
| 2017/0124158 A1 | 5/2017 | Mirhaji |
| 2017/0249384 A1 | 8/2017 | Kandylas et al. |
| 2017/0300469 A1 | 10/2017 | Mirhaji |
| 2017/0337262 A1 | 11/2017 | Smith et al. |
| 2018/0089382 A1 | 3/2018 | Allen et al. |
| 2018/0121546 A1 | 5/2018 | Dingwall et al. |
| 2018/0150753 A1 | 5/2018 | Farrell et al. |
| 2018/0225281 A1 | 8/2018 | Song et al. |
| 2018/0225382 A1 | 8/2018 | Crabtree et al. |
| 2018/0232658 A1 | 8/2018 | Acharya |
| 2018/0300409 A9 | 10/2018 | Dingwall et al. |
| 2018/0349517 A1 | 12/2018 | Kleiman-Weiner et al. |
| 2019/0102430 A1 | 4/2019 | Wang et al. |
| 2019/0163744 A1 | 5/2019 | Rosenberg et al. |
| 2019/0311003 A1 | 10/2019 | Tonkin et al. |
| 2019/0325329 A1 | 10/2019 | Rais-Ghasem et al. |
| 2019/0327331 A1 | 10/2019 | Natarajan et al. |
| 2019/0340255 A1 | 11/2019 | Huyghe et al. |
| 2019/0354544 A1* | 11/2019 | Hertz ................... G06K 9/6259 |
| 2019/0384800 A1 | 12/2019 | Elassaad |
| 2019/0391992 A1 | 12/2019 | Shah et al. |
| 2020/0012738 A1 | 1/2020 | Tung et al. |
| 2020/0042523 A1 | 2/2020 | Mirhaji |
| 2020/0050483 A1 | 2/2020 | Shear et al. |
| 2020/0057807 A1 | 2/2020 | Kapur et al. |
| 2020/0081445 A1 | 3/2020 | Stetson et al. |
| 2020/0104315 A1 | 4/2020 | Winzenried et al. |
| 2020/0117688 A1 | 4/2020 | Sequeda et al. |
| 2021/0073654 A1* | 3/2021 | Ameri ................... G06N 5/022 |

OTHER PUBLICATIONS

International Search Report and Written Opinion for International PCT Application No. PCT/US2021/030801, dated Aug. 13, 2021.

Alobaidi et al., Linked open data-based framework for automatic biomedical ontology generation, BMC Bioinformatics (Sep. 10, 2018), 19(319):1-14.

Begdouri et al., A knowledge-based approach for keywords modeling into a semantic graph, International Journal of Information Science & Technology (Mar. 15, 2018), 2(1):12-24.

Maree et al., Addressing semantic heterogeneity through multiple knowledge base assisted merging of domain-specific ontologies, Knowledge-Based Systems (Oct. 12, 2014), 73:199-211.

Martinez-Gil, Automated knowledge base management: A survey, Computer Science Review, (Nov. 2015), 18:1-9.

* cited by examiner

Consistent with [Organization] [company]'s handling of [confidential information], we are committed to protecting [PII]. As defined in the [Firm] [Information Sensitivity Classification], [PII] is any [data] that relates to or specifically identifies [individuals], such as [clients] or [employees], and includes [Country] [information] such as [U.S.] [Social Security Numbers] and similar [identification information] in other [jurisdictions].

FIGURE 2

AUTOMATED KNOWLEDGE BASE

PRIORITY CLAIM

The present application is a national stage application under 35 U.S.C. § 371 of PCT Application No. PCT/US21/30801, filed May 5, 2021, which claims priority to U.S. provisional patent application Ser. No. 63/020,878, filed May 6, 2020, which is incorporated herein by reference.

BACKGROUND

Automated Knowledge Bases are large repositories of knowledge structured as entities and the relationships between them that are compiled through some automated effort. While manually compiled and updated knowledge bases have long been prevalent within many contexts (marketing, support, IT, operations), the key differentiator is that automated knowledge bases typically rely on machine learning to constitute themselves, ensure accuracy, and grow.

A key difference between a knowledge graph and a knowledge base comes down the notion of a graph. All knowledge graphs are knowledge bases, but not all knowledge bases are created in the form of graphs. Three key differentiators between knowledge graphs and knowledge bases include: (1) Knowledge graphs typically provide a greater focus on connections between entities; (2) Knowledge graphs are semantic representations, meaning data are encoded side-by-side with the meaning of the data; and (3) knowledge graphs rely on an ontology. There are knowledge bases that also focus on connections and semantic data (particularly automated knowledge bases). However, a knowledge base is typically thought of as a wider term that also constitutes instances such as help desk resources, a collection of articles, or arrangements of media meant for purposes other than a database.

SUMMARY

In one general aspect, the present invention is directed to a domain specific knowledge base (KB) containing all concepts from that domain and the semantic relations between them. The concepts and the semantic relations are extracted from an existing corpus of content for the domain, such as, in a corporate context, curated corporate content (e.g. policies and procedure). In various embodiments, the World Wide Web Consortium (W3C) standard SKOS (Simple Knowledge Organization System) can be used and two types of semantic relations can be captured: hierarchal and associative. A Natural Language Processing (NLP) software engine can parse the input text to create a semantic knowledge graph, which is then mapped to a SKOS knowledge model. During the linguistic understanding of the text, relevant domain concepts are identified and connected by semantic links—abstractions of underlying relations between concepts that capture the overall meaning of text. Once the KB is built, concepts automatically identified as most important in this domain can be promoted to another layer, referred to as "Topics." One benefit, therefore, that can be realized through embodiments of the present invention is a multi-layer conceptual representation of a domain knowledge and the reusability of creation pipeline to any domain.

According to various embodiments, a computer system according to the present invention comprises can comprise a processor core and a memory in communication with the processor core. The memory stores software that when executed by the processor core, causes the processor core to: extract semantic triples from text in a set of domain-specific electronic documents, where the extracted triples are represented as subject, predicate and object, such that the subject and the object have a semantic relationship; generate an ontology from the exacted semantic triples; and generate a Simple Knowledge Organization System knowledge base (SKOS KB) from the ontology. The memory can further store software that when executed by the processor core causes the processor core to identify topics in the SKOS KB by: for each concept in the SKOS KB, constructing a computational cluster graph around a centroid that is the concept, where the computational cluster graph comprises, as vertices, other concepts in the SKOS KB that are related and narrower than the centroid; computing a score for each of the computational cluster graphs according to a scoring algorithm; identifying as topic candidates one or more concept whose corresponding computational cluster graph has a score greater than a threshold value; and validating the topic candidates to identify one or more topics.

These and other potential benefits that can be realized through embodiments of the present invention be apparent from the description that follows.

FIGURES

Various embodiments of the present invention are described herein by way of example in connection with the following figures.

FIG. 2 depicts an example of concept extraction according to various embodiments of the present invention.

DESCRIPTION

Figure 1:
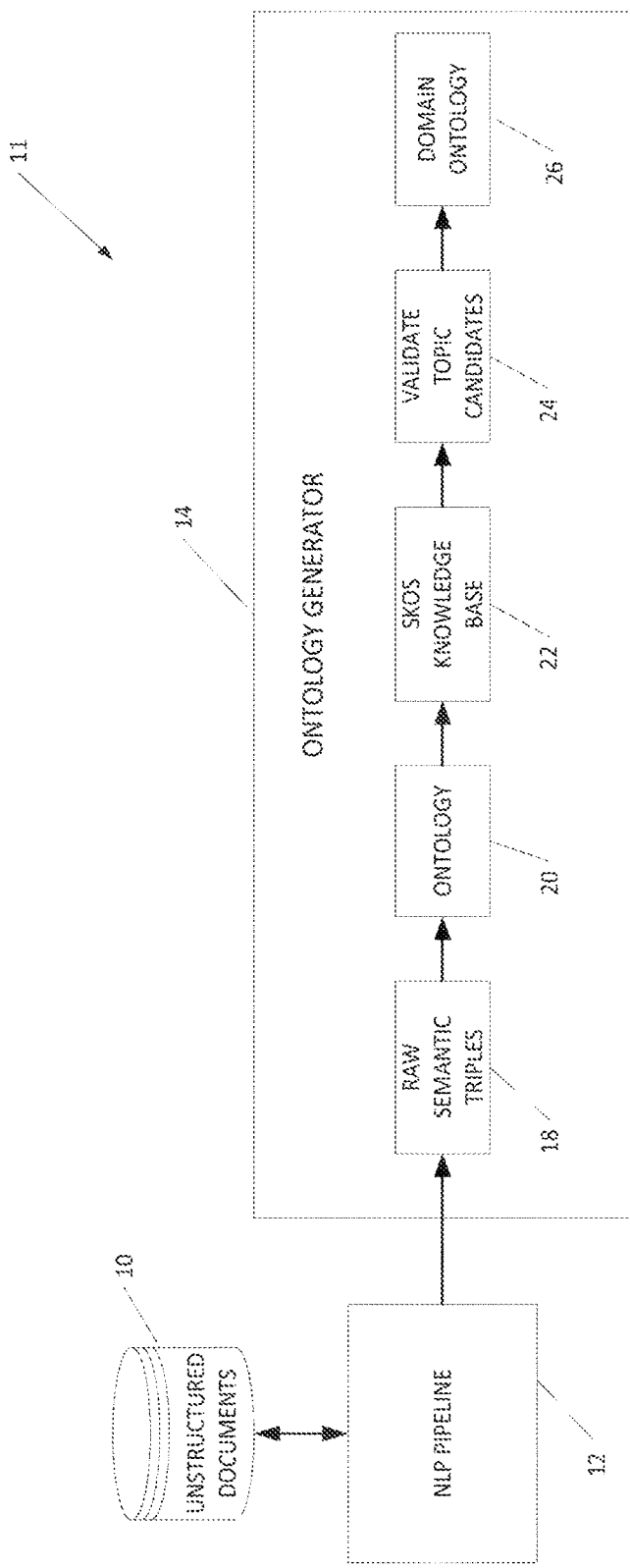
FIGS. 1 and 8 depict a computer system for generating the automated knowledge base according to various embodiments of the present invention.

A domain specific KB is a semantic network representing the knowledge within a specific domain (finance, biology or even more specifically a company). A computer system according to the present invention performs (at least) two innovation processes: the extraction of a SKOS domain specific Knowledge Base from an existing corpus of curated corporate content, and the automated identification of topics in a domain specific Knowledge Base. SKOS is a W3C recommendation designed for representation of thesauri, classification schemes, taxonomies, subject-heading systems, or any other type of structured controlled vocabulary. SKOS is part of the Semantic Web family of standards built upon RDF and RDFS, and its main objective is to enable easy publication and use of such vocabularies as linked data. W3C released the standard in August 2009.

SKOS provides a model for expressing the basic structure and content of concept schemes such as thesauri, classification schemes, subject heading lists, taxonomies, folksonomies, and other similar types of controlled vocabulary. As an application of the Resource Description Framework (RDF), SKOS allows concepts to be composed and published on the World Wide Web, linked with data on the Web and integrated into other concept schemes. In basic SKOS, conceptual resources (concepts) are identified with URIs, labeled with strings in one or more natural languages, documented with various types of note, semantically related to each other in informal hierarchies and association networks, and aggregated into concept schemes. In advanced SKOS, conceptual resources can be mapped across concept schemes and grouped into labeled or ordered collections. Relationships can be specified between concept labels. Finally, the SKOS vocabulary itself can be extended to suit the needs of particular communities of practice or combined with other modeling vocabularies.

The fundamental element of the SKOS vocabulary is the "concept." Concepts are the units of thought—ideas, meanings, or (categories of) objects and events—which underlie many knowledge organization systems. As such, concepts exist in the mind as abstract entities which are independent of the terms used to label them. SKOS introduces the class "skos:Concept," which allows implementers to assert that a given resource is a concept. This is done in two steps: by creating (or reusing) a Uniform Resource Identifier (URI) to uniquely identify the concept; and by asserting in RDF, using the property "rdf:type," that the resource identified by this URI is of type skos:Concept. Using SKOS to publish concept schemes makes it easy to reference the concepts in resource descriptions on the Semantic Web. HTTP URIs can be used when minting concept URIs since they are resolvable to representations that can be accessed using standard Web technologies. More details about SKOS are available at www.w3.org/TR/2009/REC-skos-reference-20090818/.

Using SKOS, "concepts" can be identified using URIs, labeled with lexicon strings in or more natural languages, associated notations (lexical codes), documented with various types of note, linked to other concepts and organized into informal hierarchies and association networks, aggregated into concept schemes, grouped into labeled and/or ordered collections, and mapped to concepts in other schemes. The SKOS data model enables features listed above—identifying, labeling, documenting, linking, and mapping concepts, and aggregating concepts into concept schemes or collections—by defining the elements depicted in FIG. 10.

An example of the process for extraction of the SKOS domain specific KB is depicted in FIG. 1. FIG. 1 shows a computer system 11 that comprises a natural language processor (NLP) pipeline 12 and an ontology generator 14. Both the NLP 12 and the ontology generator 14 may be implemented with software that is stored in a memory of the computer system 11 and executed by a processor(s) of the computer system 11. FIG. 1 also shows the corpus of documents 10, which may comprise electronic documents that are stored in a database of the computer system 11.

The extraction of a SKOS domain specific KB from the existing corpus of curated corporate content 10 can involve (1) triples extraction and (2) ontology generation. Triples extraction can be performed by the NLP pipeline 12. Triples extraction can involve concept extraction and relations extraction. Topics prediction can involve semantic clustering and topic prediction from topic candidates and topic validation. These features and concepts are described below.

For triples extraction, knowledge from the text in the unstructured documents 10 is extracted in the form of semantic triples with the NLP pipeline 12. The NLP pipeline 12 can receive the text of the documents 10 as input and identify a variety of key concepts and semantic relations between the concepts. In various embodiments, the NLP pipeline 12 can comprise software from Lymba Corporation, whose NLP pipeline software comprises a chain of individual modules. Each module extracts and labels specific types of information that later modules and/or applications can build on top of The NLP processing starts with shallow NLP tasks, from text segmentation to syntactic parsing. Then deep semantic processing is performed. The semantic parser uses many (e.g., more than twenty) basic semantic relation types to express semantic connectivity for all concepts in text. These types may be specifically chosen to guarantee a complete and robust semantic representation of text.

Triples may be represented as subject, predicate, object also known as "SPO." The SPO format enables knowledge to be represented in a machine-readable way. Every part of the triple can be individually addressable via unique Uniform Resource Identifiers (URIs). Given this precise representation, semantic data can be unambiguously queried and reasoned about. The components of a triple, such as the statement "The sky has the color blue," consist of a subject ("the sky"), a predicate ("has the color"), and an object ("blue"). From this basic structure, triples can be composed into more complex models, by using triples as objects or subjects of other triples. Given their particular, consistent structure, a collection of triples is often stored in purpose-built databases called Triplestores for storage and retrieval of triples through semantic queries.

Figure 4:
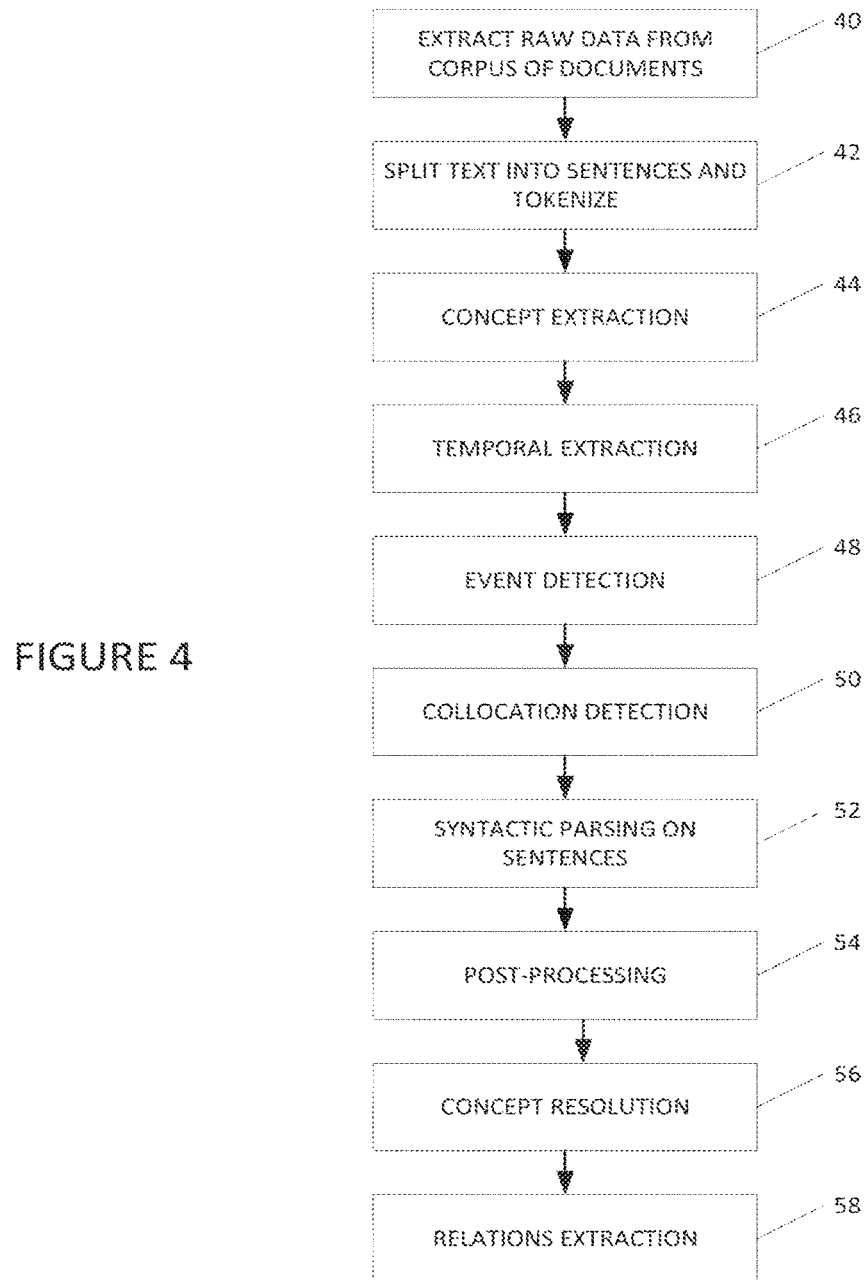
FIG. 4 illustrates an example of the process flow of the NLP pipeline of FIG. 1 according to various embodiments of the present invention to perform triples extraction.

FIG. 4 illustrates an example of the process flow of the NLP pipeline 12 according to various embodiments of the present invention to perform triples extraction. Each step shown in FIG. 4 can be performed by a separate module of the NLP pipeline 12, although in some embodiments, more than one step could be performed by a single module. The first step, at block/step 40 of FIG. 4, is to extract raw data from the corpus of input documents. The text is then split, at step 42, into sentences, which will be tokenized.

For concept extraction, at step 44, the NLP pipeline concept detection method ranges from the detection of simple nominal and verbal concepts to more complex named entity and phrasal concepts, such as shown in the example of FIG. 2. A hybrid approach can be used to named entity recognition that makes use of machine learning classifiers, a cascade of finite-state automatons, and lexicons to label more than, for example, eighty (80) types of named entities, including person, organizations, various types of locations, quantities, numerical values, etc. This module can be retrained to easily define, identify, and label new types of entities that may be relevant to a specific domain, such as legal entity, software agent, organization, etc. by using company/domain ontologies.

At step 46, a temporal expression detection framework can use a pattern-based approach and hand-coded rules to detect absolute dates (28 Apr. 2020) and times (5:00 pm), partial dates (28 April), relative dates (next Monday) and fuzzy dates (a few weeks ago) in text. All these expressions are resolved and normalized to temporal data structures that facilitate robust representation and manipulation of time expressions.

At step 48, an event detection tool can be used that detects candidate event concepts in text, identifies their event class (e.g., reporting, perception, aspectual, etc.) and builds event structures that capture the attributes and participants of an event. All event structures can include normalized attributes like temporal and spatial information associated with the event and other useful features, such as tense, aspect, and more.

Furthermore, at step 50, the algorithm can use WordNet2-based concept detection methods with lexico-syntactic and semantic rules for identifying multi-word phrases as concepts (collocation detection). Examples include virtual reality and build out.

In addition, at step 52, a part of speech (POS) algorithm can be applied to enable a syntactic parse on sentences. Once there is a treebank POS of sentences, concepts can be extracted based on their role in the sentences. Named entity and noun phrase extraction can be used in the process of concept extraction.

Post-processing can be applied at step 54 to extracted concepts like concept resolution, lemmatization and/or stemming to produce normalized forms, filter descriptive adjectives, convert plural forms, and remove determiners/numerals, etc.

Concept resolution can be used at step 56, which aims to identify and cluster entities and events, definite nouns and pronouns that co-refer to each other within a single document as well as across documents. Within a document, the algorithm's modular design can consist of four general steps: (1) mention detection—named entity/word sense based hand crafted rules; (2) feature extraction—context, distance, and semantic features; (3) pair-wise classification—linear SVM classification with one model per anaphor type and agreement-based pair filtering; and (4) best-first clustering with a threshold for the no-antecedent case.

Figure 3:
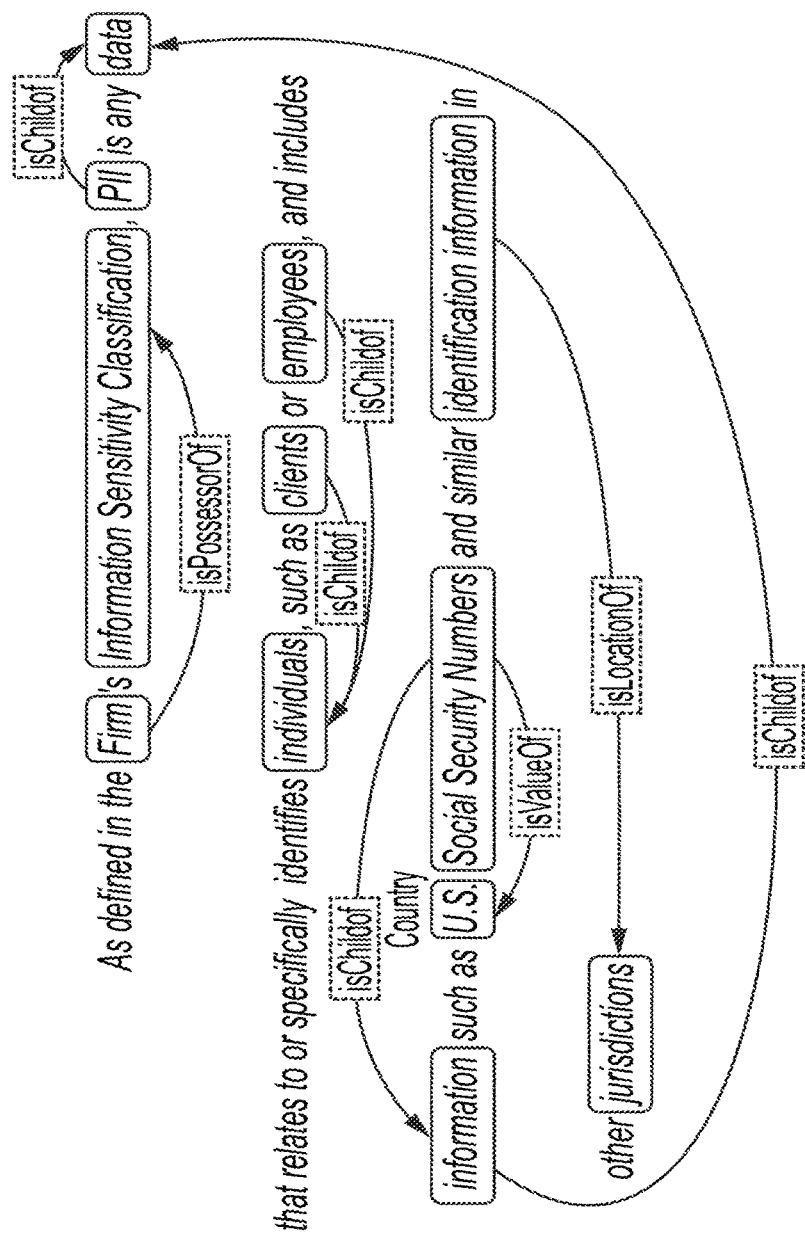
FIG. 3 depicts an example of semantic relation extraction according to various embodiments of the present invention.

For relations extraction at step 58, the NLP pipeline 12 can also extract semantic relations as abstractions of underlying relations between concepts, and can occur within a word, between words, between phrases, and between sentences. All relations that link the identified domain concepts can be collected, concepts linked to these by semantic relations (ISA, PW, SYN, etc.) can be pinpointed, and concepts to create a concept hierarchy and resolve conflicts/redundancies can be classified. A fixed set of, for example, twenty six (26) relationships can be used, which strike a good balance between too specific and too general, such as shown in the example of FIG. 3. The output of the NLP pipeline 12 can be translated into the semantic triples that can be stored in a semantic database to build the KB.

Figure 5:
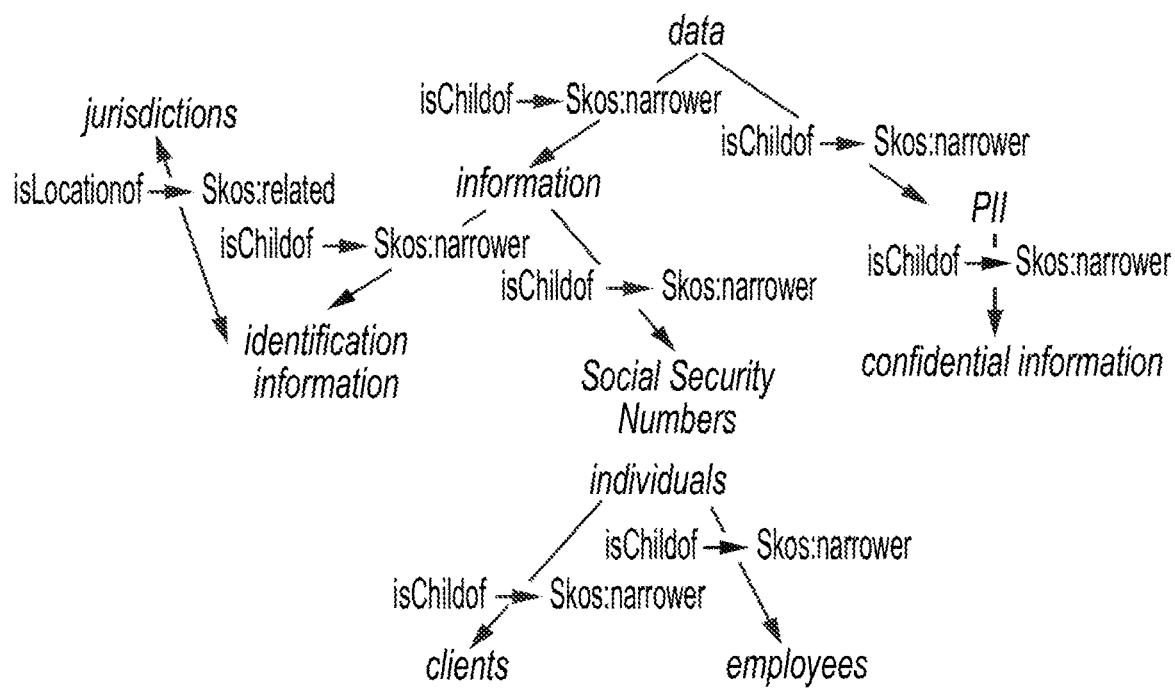
FIG. 5 depicts an SKOS ontology converted from an OWL ontology according to various embodiments of the present invention.

Referring to FIG. 1, the raw semantic triples 18 extracted by the NLP pipeline 12 are input to the ontology generator 14 for generation of the SKOS domain specific KB. For ontology generation, an OWL (Web Ontology Language) ontology 20 can be generated, by the ontology generator 14, based on the raw semantic triples 18 extracted with the NLP pipeline 12. For this step, the ontology generator 14 can identify hierarchical relationships in the triples 18, and build classes, instances and relations for the ontology. The ontology 20 is then converted to a SKOS (Simple Knowledge Organization System) knowledge base 22, an example of which is shown in FIG. 5. The SKOS ontology can be improved by adding more relations. Associative relations can be added by applying a word-embedding algorithm to the original text corpus. Hierarchical relations can then be added by analyzing the concept's syntax.

Figure 10:
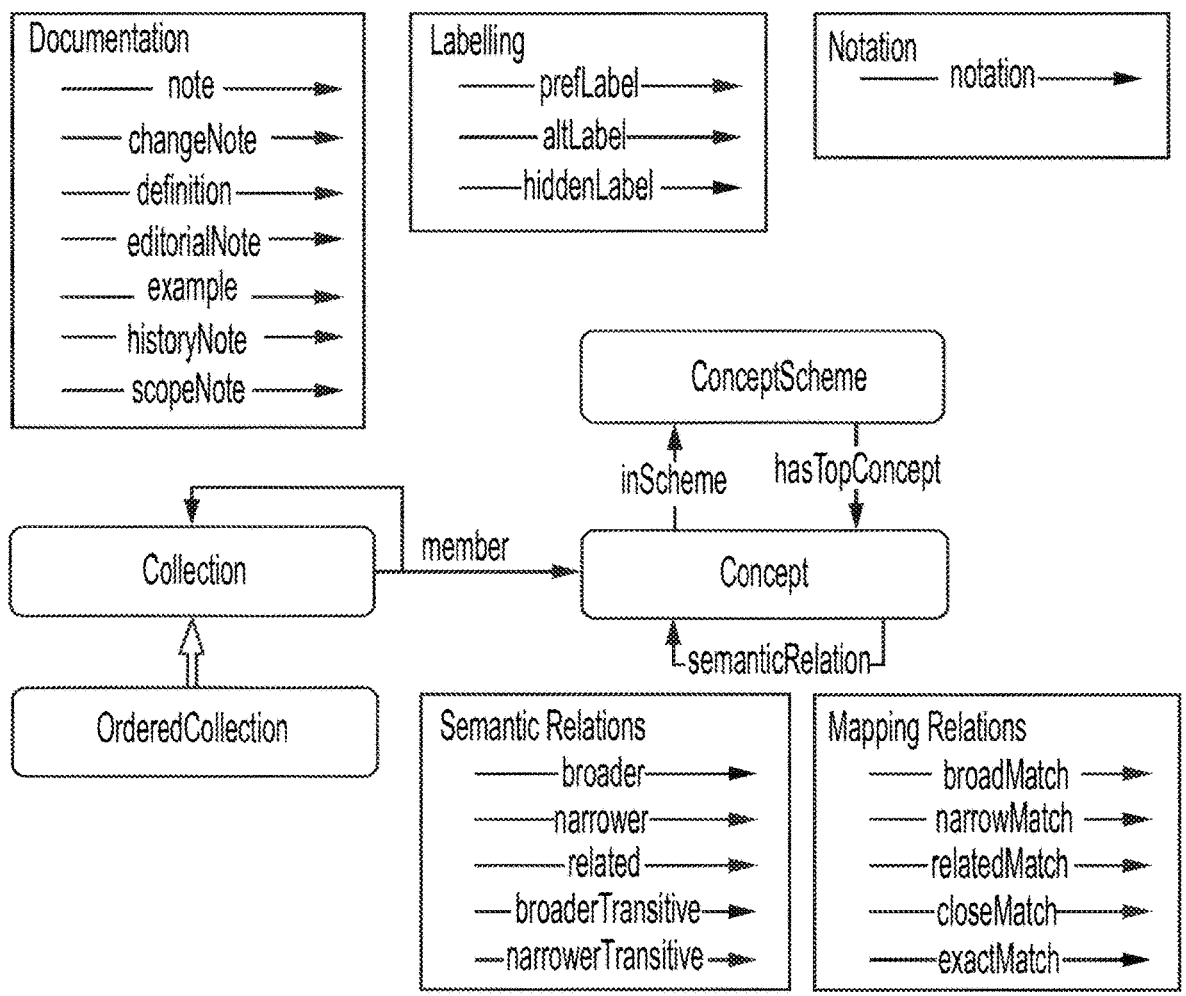
FIG. 10 depicts main elements of a SKOS data model.

For topics prediction, the first layer of the KB is concepts, as shown in FIG. 10. The second layer, according to various embodiments of the present invention, can be "Topics." That is, important concepts can be promoted to the upper level of a conceptual representation referred to as "Topics." The computer system of the present invention provides an improved way to identify domain topics in a domain specific SKOS Knowledge Base. The topic identification method consists of two main steps. The first step is semantic clustering and the second is topic identification.

Figure 6:
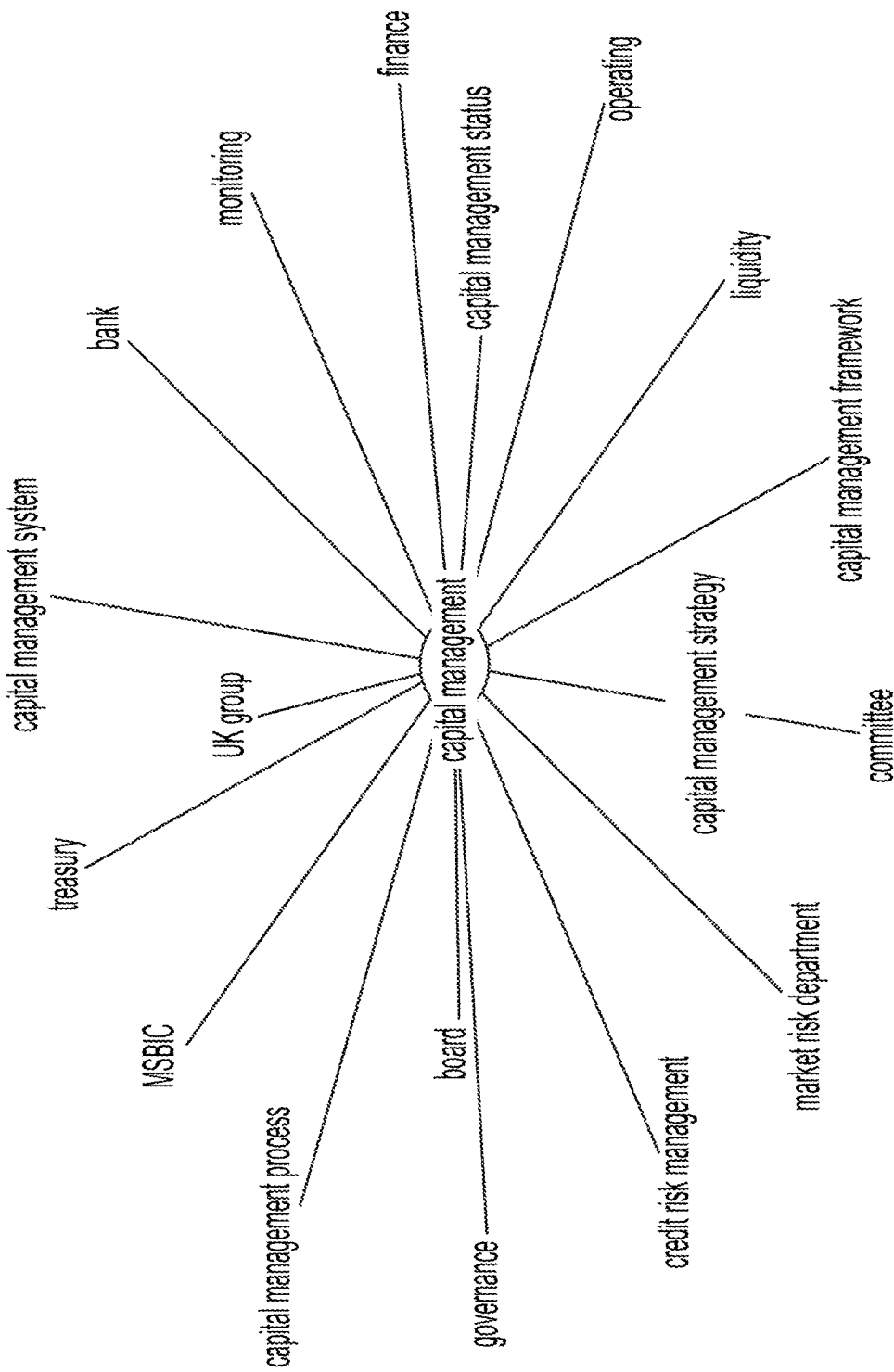
FIG. 6 depicts an example of semantic cluster around a fixed centroid according to various embodiments of the present invention. Capital management is the centroid in this example.

Multiple clustering methods exist in literature including partitioning methods, hierarchical clustering, fuzzy clustering, density-based clustering and model-based clustering. Other known clustering methods include K-means and Latent Dirichlet Allocation (LDA). The result of those methods was not good enough due to the deficiency of semantic and context considerations, and the number of tokens by concept (e.g. 3-gram 4-gram . . . ). To combat these deficiencies, a new method is proposed to identify important concepts in a specific domain using a new clustering method that the inventors call "semantic clustering." Each concept in the KB is considered as a cluster's centroid; a cluster around each centroid is built that contains all related and narrower concepts with the centroid, an example of which is shown in FIG. 6.

The cluster's elements can be considered as vertices and all relations between them as edges to build a computational graph G=(V, E) of this cluster, where V are vertices set and E the edges. V are all concepts from the cluster built around the centroid and defined as:

$$V = \{\forall\, v \in KB;\, \exists\, E(v, v_{centroid}), v_{centroid}\}$$

E are relations between each concept in the cluster and defined as:

$$E \subseteq \{\{v_1, v_2\} \mid (v_1, v_2) \in V^2 \wedge v_1 \neq v_2\}$$

A "topic" can be considered to be any concept that is important enough to the domain to be promoted to this dimension. A PageRank algorithm can be used for topic candidates. A PageRank algorithm is a scoring function of networks in general and graphs in particular. The PageRank algorithm measures the importance of each node within the graph, based on the number incoming relationships and the importance of the corresponding source nodes. The underlying assumption roughly speaking is that a page is only as important as the pages that link to it. PageRank is an algorithm used by Google Search to rank web pages in their search engine results.

Once the PageRank scores are calculated for each graph/concept, concepts as topic candidates can be identified. All concepts with a PR score greater than the average of PageRank score in the cluster can be considered a topic candidate, such as using the following algorithm:

$$PR_{average} = \frac{\sum_{i=1}^{n} PR(v_n)}{n}$$

if $PR(v_n) \geq PR_{average} \leftrightarrow v_n$ is topic *candiate*

Figure 7:
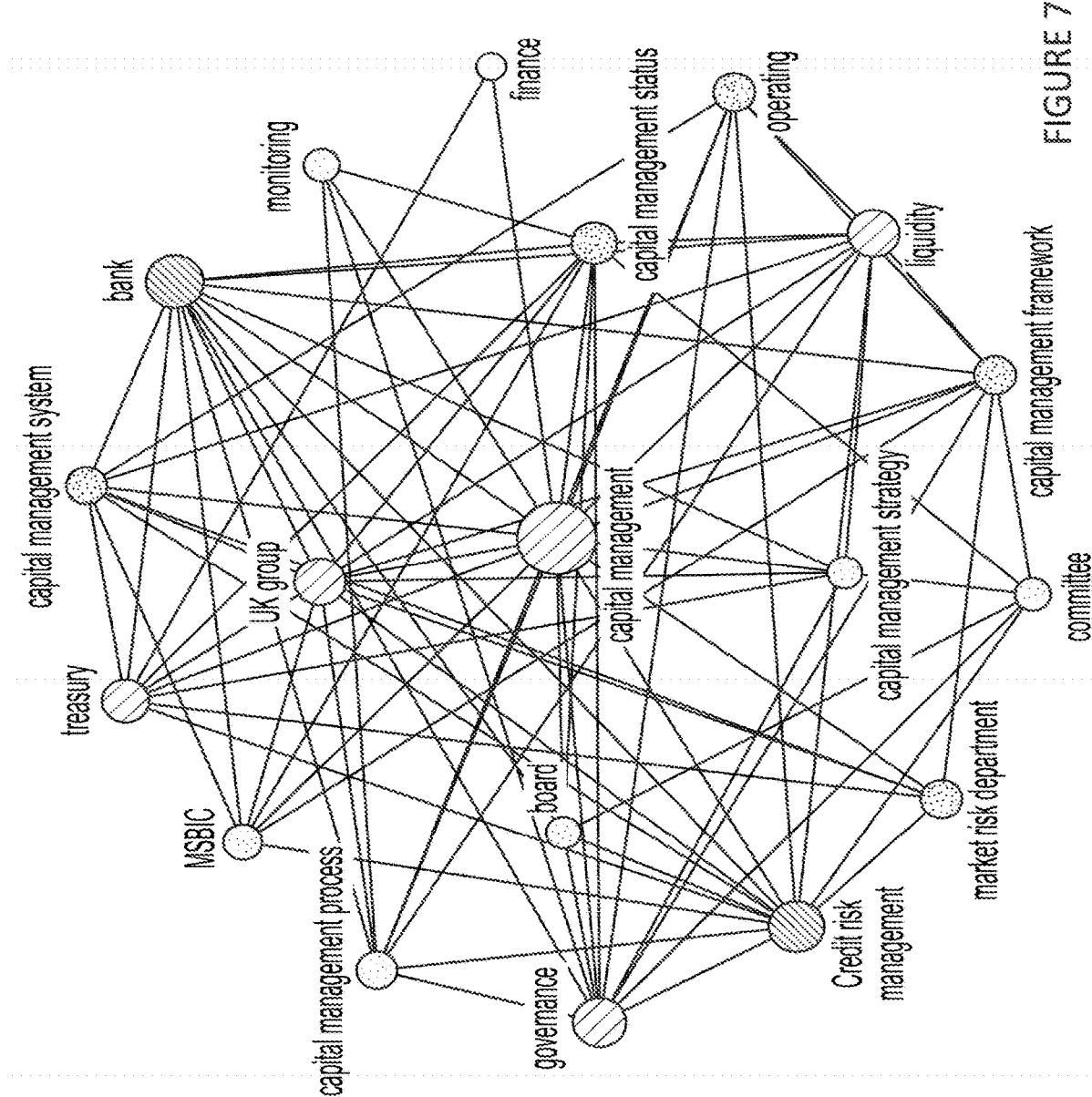
FIG. 7 depicts a Graph G with PageRank score according to various embodiments of the present invention.

FIG. 7 shows an example graph with PageRank score information. The size and shading of the vertices are based on the PageRank score.

Returning to FIG. 1, after generating the SKOS KB 22, it can be validated at step 24. Validation of the SKOS KB 22 can involve data cleaning, manual concepts validation, enriching of concepts, and relation discovery. To validate topic candidates, two conditions can be applied. If a concept was a leaf in the KB (without any child), or it had just one child, that concept is not considered to be a topic because it did not cover enough space from the KB to be considered as topic. Secondly, if the concept had one or less broader concepts, it can be considered too generic to cover a particular topic from the domain (i.e. a very general concept). Put another way, if a vertex (corresponding to a concept) in the graph has more than 1 child and 1 or more parents, it can be classified as a topic. If a vertex has more than 1 child but not more than 1 parent, it is too generic to be a topic. And if the vertex has does not have more than one child, it is not a topic.

The relation discovery at the domain validation step 24 can involve deep learning algorithms, such as, for example, a Word2vec algorithm. The Word2vec algorithm uses a neural network model to learn word associations from a large corpus of text. Once trained, the model can detect synonymous words or suggest additional words for a partial sentence. The algorithm represents each distinct word with a vector such that the cosine similarity between vectors indicates the level of semantic similarity between words represented by those vectors.

Once the SKOS KB is validated, the domain ontology can be completed at step/block 26 by, for example, entity resolution and predicate mapping.

Knowledge bases store critical information about domains of interest and serve as the backbone for semantic technology applications. However, manually populating knowledge bases is time consuming and error prone, with an end product that is difficult to maintain. Thus, a SKOS KB generated according to embodiments of the present invention can be automatically generated in a less time-consuming manner and in a manner that is less-prone to error due to obviating the need for human intervention. A SKOS KB according to embodiments of the present invention should also be easier to maintain than a KB generated in a different way.

Figure 9:
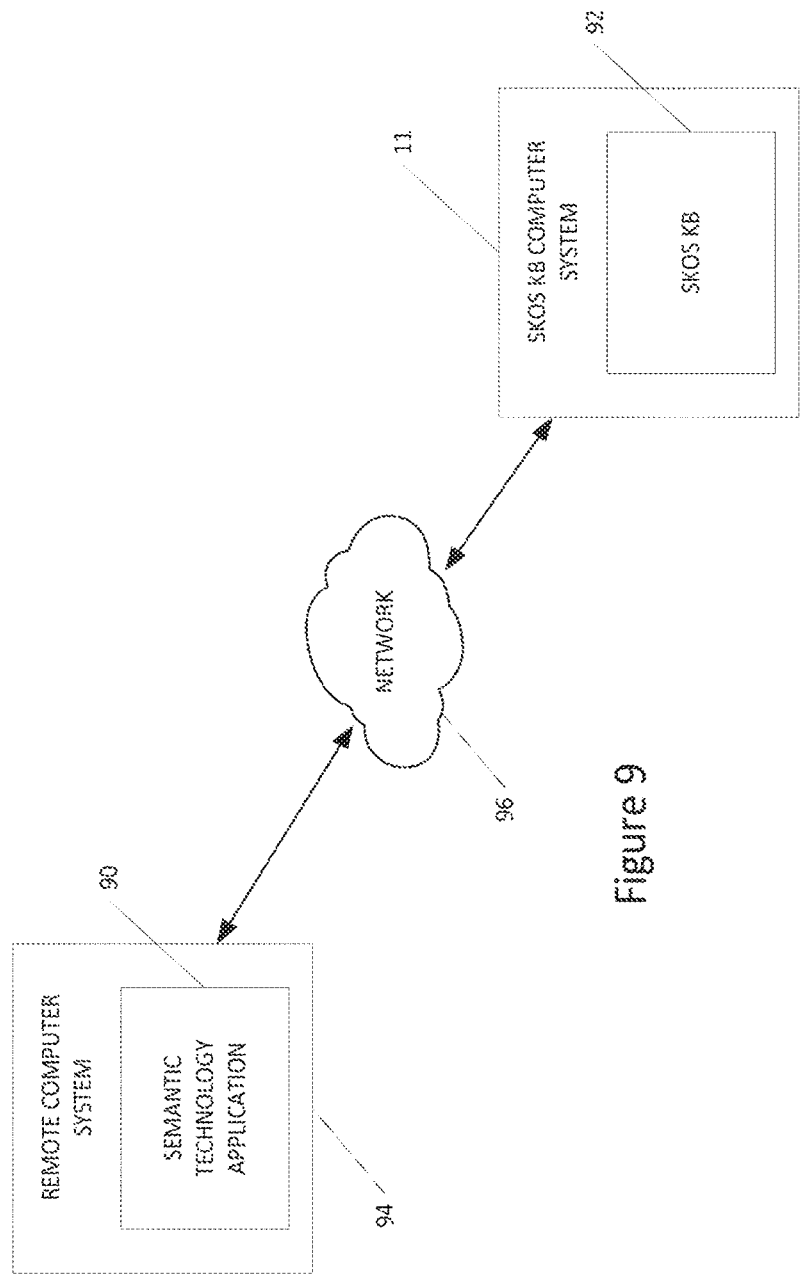
FIG. 9 depicts a remote computer system with a semantic technology application in communication with a computer system that stores the SKOS KB according to various embodiments of the present invention.

The concepts and topics of the SKOS KB can be identified with unique URIs. Other applications can then use the SKOS KB using, for example, standard Web technologies. For example, FIG. 9 illustrates a computer system architecture that includes a semantic technology application 90 in communication with the computer system 11, which stores the generated SKOS KB 92; for example, the concepts can be identified by the unique URIs. The semantic technology application 90 may be, for example, a software application that tags content based on the SKOS KB 92 or that classifies documents (or other files) based on the SKOS KB 92. Such classification applications may be used, for example, to classify documents for risk compliance or risk governance, particularly where the SKOS KB 92 is used by a financial institution. The semantic technology application 90 may be stored in memory and run by a processor of a remote computer system 94 that is in communication, via a network 96, with the computer 11 that stores the SKOS KB 92 in a memory or triplestore, for example, of the computer system 11. The stored SKOS KB 92 may be embodied as a triple(s) that includes subjects, predicates, and objects. Other formats for containing the information of the knowledge base may be used such as a turtle (.ttl), N-triples (.nt), JSON-like format, a No-sql database, RDF/XML format, a data format based on a Prolog language, etc. The knowledge base 92 may be in a format that enables access, e.g., by the semantic technology application 90, to the terms stored in the knowledge base 92. The network 96 may be a computer data network such as a LAN, WAN, the Internet, an intranet, etc.

Figure 8:
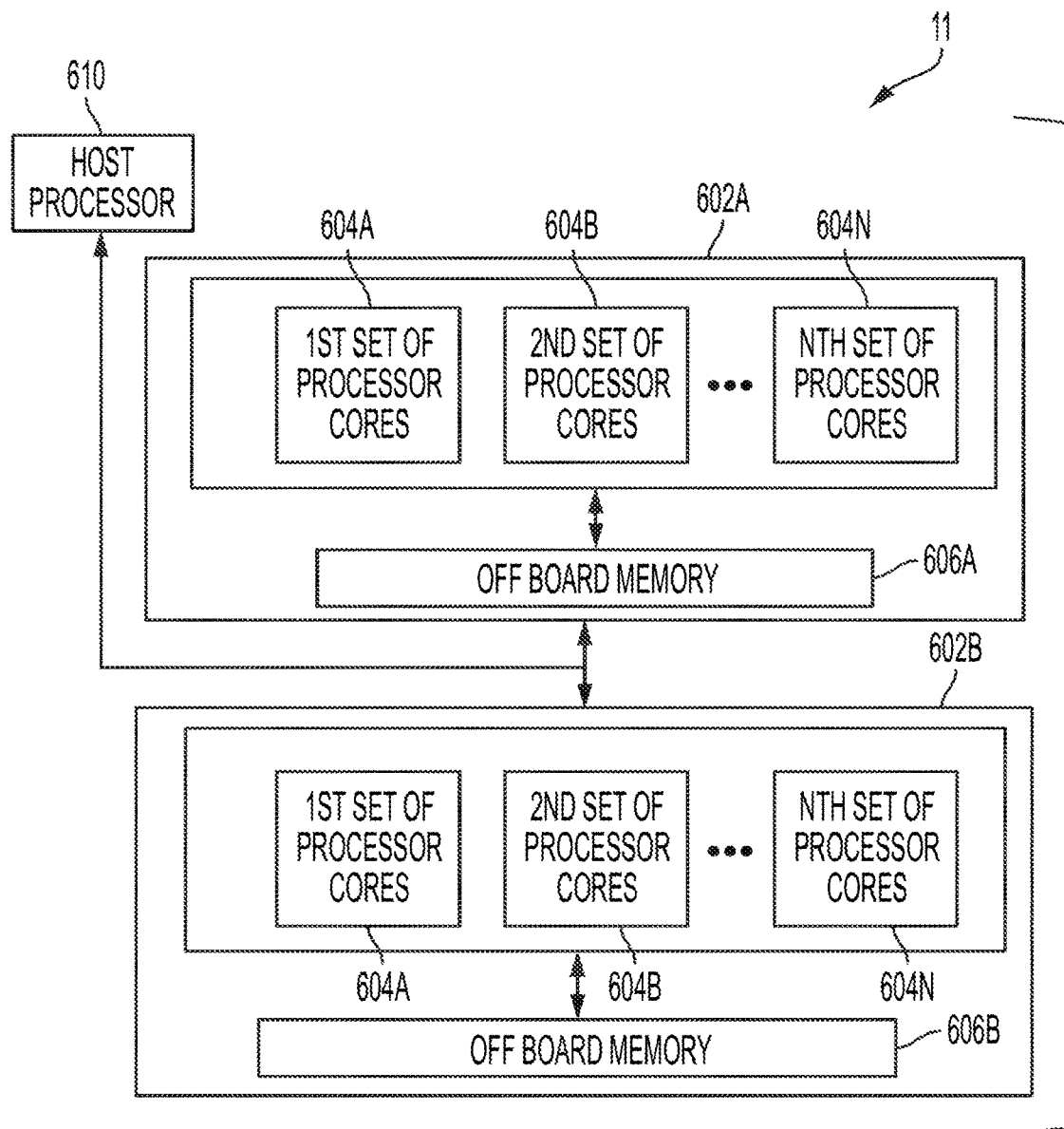

FIG. 8 is another diagram of the computer system 11 that could be used to implement the embodiments described above. The illustrated computer system 11 comprises multiple processor units 602A-B that each comprises, in the illustrated embodiment, multiple (N) sets of processor cores 604A-N. Each processor unit 602A-B may comprise on-board memory (ROM or RAM) (not shown) and off-board memory 606A. The on-board memory may comprise primary, volatile and/or non-volatile, storage (e.g., storage directly accessible by the processor cores 604A-N). The off-board memory 606A-B may comprise secondary, non-volatile storage (e.g., storage that is not directly accessible by the processor cores 604A-N), such as ROM, HDDs, SSD, flash, etc. The processor cores 604A-N may be CPU cores, GPU cores and/or AI accelerator cores.

The software for the NLP pipeline 12 and the ontology generator 14 may be stored in either the on-board or off-board memory 606A, 606B and executed by the processor units 602A-602B. For example, one or more of the processor cores could be used for the NLP pipeline 12 and another set of processor cores could be used for ontology generator 14. In other embodiments, the computer system 11 could be implemented with one processor unit that is programmed to perform the functions described above by, for example, executing the software of the NLP pipeline 12 and the ontology generator 14. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the computer system 11, e.g., the NLP pipeline 12 and the ontology generator 14, may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, CUDA, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer systems and computer-implemented methods for generating an automated knowledge base. The computer system comprises a processor core and a memory in communication with the processor core. The memory stores software that when executed by the processor core, causes the processor core to: extract semantic triples from text in a set of domain-specific electronic documents, where the extracted triples are represented as subject, predicate and object, such that the subject and the object have a semantic relationship; generate an ontology from the exacted semantic triples; and generate a Simple Knowledge Organization System knowledge base (SKOS KB) from the ontology.

In various implementations, the memory further stores software that when executed by the processor core causes the processor core to identify, and the methods further comprise identifying, topics in the SKOS KB, by: for each concept in the SKOS KB, constructing a computational cluster graph around a centroid that is the concept, where the computational cluster graph comprises, as vertices, other concepts in the SKOS KB that are related and narrower than the centroid; computing a score for each of the computational cluster graphs according to a scoring algorithm; identifying as topic candidates one or more concepts whose corresponding computational cluster graph has a score greater than a threshold value; and validating the topic candidates to identify one or more topics.

In various implementations, the computational cluster graph comprises relations between each of the vertices in the computational cluster graph; and/or the threshold value is an average of the scores for the computational cluster graphs.

In various implementations, the memory further stores software that when executed by the processor core causes the processor core to validate, and the method further comprises validating, a topic candidate as a topic by excluding each identified topic candidate that meets at least one of the following conditions: the identified topic candidate has at most one child in the SKOS KB; and the identified topic candidate has at most one broader concept.

In various implementations, the memory further stores software that when executed by the processor core causes the processor core to discover, and the method further comprises discovering, relations between the concepts to validate topic candidates using a deep learning algorithm.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for classifying resource description framework ("RDF") triples based on a generated automated knowledge base, the computer system comprising:
   a knowledge base computer system; and
   a remote computer system that is in communication with the knowledge base computer system via a data network, wherein:
   the knowledge base computer system comprises:
      a processor core;
      a memory in communication with the processor core, wherein the memory stores software that when executed by the processor core, causes the processor core to:
         extract semantic triples from text in a set of domain-specific electronic documents, wherein the extracted semantic triples are represented as subject, predicate and object, such that the subject and the object have a semantic relationship;
         generate an ontology from the exacted semantic triples;
         generate a Simple Knowledge Organization System knowledge base (SKOS KB) from the ontology;
         identify topics in the SKOS KB by:
            for each concept in the SKOS KB, construct a computational cluster graph around a centroid that is the concept, wherein the computational cluster graph comprises, as vertices, other concepts in the SKOS KB that are related and narrower than the centroid;
            compute a score for each of the computational cluster graphs according to a scoring algorithm; and
            identify as topic candidates one or more concepts whose corresponding computational cluster graph has a score greater than a threshold value; and
         store the SKOS KB in the memory such that the concepts in the SKOS KB are identified by unique Hypertext Transfer Protocol (HTTP) Uniform Resource Identifiers (URIs); and
      the remote computer system is programmed to access the concepts in the SKOS KB using the URIs for the concepts and to classify RDF triples based on the SKOS KB stored in the knowledge base computer system.

2. The computer system of claim 1, wherein the computational cluster graph comprises relations between each of the vertices in the computational cluster graph.

3. The computer system of claim 1, wherein the threshold value is an average of the scores for the computational cluster graphs.

4. The computer system of claim 1, wherein the memory further stores software that when executed by the processor core causes the processor core to validate a topic candidate as a topic by excluding each identified topic candidate that meets at least one of the following conditions:
   the identified topic candidate has at most one child in the SKOS KB; and
   the identified topic candidate has at most one broader concept.

5. The computer system of claim 4, wherein the memory further stores software that when executed by the processor core causes the processor core to discover relations between the concepts to validate topic candidates using a deep learning algorithm.

6. A method for classifying resource description framework ("RDF") triples based on a generated automated knowledge base, the method comprising:
   extracting, by a knowledge base computer system, semantic triples from text in a set of domain-specific electronic documents, wherein the extracted semantic triples are represented as subject, predicate and object, such that the subject and the object have a semantic relationship;
   generating, by the knowledge base computer system, an ontology from the exacted semantic triples;
   generating, by the knowledge base computer system, a Simple Knowledge Organization System knowledge base (SKOS KB) from the ontology;
   identifying topics in the SKOS KB by:

for each concept in the SKOS KB, construct a computational cluster graph around a centroid that is the concept, wherein the computational cluster graph comprises, as vertices, other concepts in the SKOS KB that are related and narrower than the centroid;
compute a score for each of the computational cluster graphs according to a scoring algorithm; and
identify as topic candidates one or more concepts whose corresponding computational cluster graph has a score greater than a threshold value;
storing the SKOS KB in a memory of the knowledge base computer system, such that the concepts in the SKOS KB are identified by unique Hypertext Transfer Protocol (HTTP) Uniform Resource Identifiers (URIs); and
classifying, by a remote computer system that is in communication with the knowledge base computer system via a data network, RDF triples based on the SKOS KB stored in the memory of the knowledge base computer system, wherein the remote computer system accesses the concepts in the SKOS KB using the URIs for the concepts.

7. The method of claim 6, wherein the computational cluster graph comprises relations between each of the vertices in the computational cluster graph.

8. The method of claim 6, wherein the threshold value is an average of the scores for the computational cluster graphs.

9. The method of claim 6, wherein validating a topic candidate as a topic comprises excluding each identified topic candidate that meets at least one of the following conditions:

the identified topic candidate has at most one child in the SKOS KB; and the identified topic candidate has at most one broader concept.

10. The method of claim 9, further comprising discovering, by the knowledge base computer system, relations between the concepts to validate topic candidates using a deep learning algorithm.

\* \* \* \* \*